Oct. 20, 1931.  E. A. KIRCHNER  1,828,420
SCARFPIN SAFETY CLUTCH AND POINT PROTECTOR
Filed Oct. 16, 1930
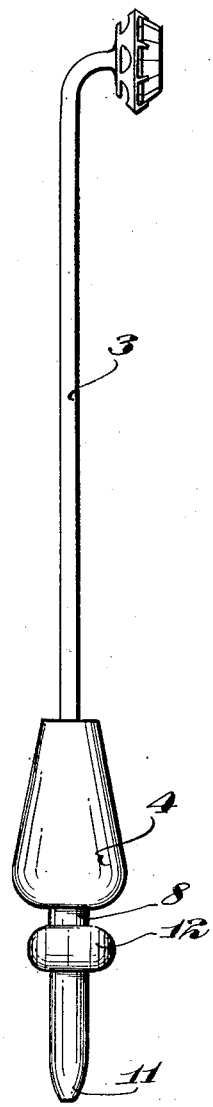
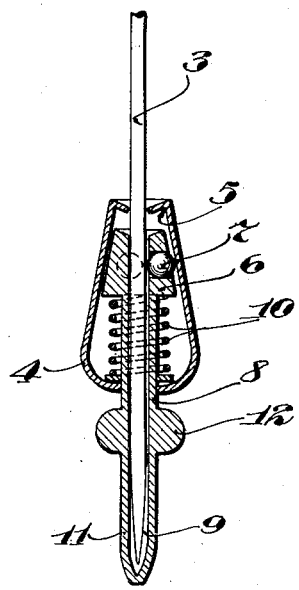
Inventor
Ernst A. Kirchner
By his Attorneys Patented Oct. 20, 1931

1,828,420

UNITED STATES PATENT OFFICE

ERNST A. KIRCHNER, OF MINNEAPOLIS, MINNESOTA

SCARFPIN SAFETY CLUTCH AND POINT PROTECTOR

Application filed October 16, 1930. Serial No. 489,115.

My present invention relates to improvements in scarf pin safety clutches and has for its object to provide such a clutch with a guard or protector to cover the point of a scarf pin.

In wearing a scarf pin in a necktie it is quite the general practice to apply a safety clutch to the pointed end portion of the scarf pin after it has been put in place in the necktie to prevent the same from working out of the tie and being lost. A scarf pin after applied to a necktie is in an upright position with its pointed end portion projecting out of the tie at the back thereof and between the shirt front and tie. The safety clutch is applied to this projecting end portion of the scarf pin by slipping the same thereover from the point and positioned thereabove, thus leaving the point of the pin unprotected. The movement of the wearer's body causes the point of the pin to stick into his shirt front and thereby move the upper end portion of the scarf pin horizontally outward from his body which carries the tie therewith and folds or buckles the same outward from the front of the shirt, thus giving the necktie an untidy appearance. The scarf pin when in this position will often stick into the body of the wearer.

My invention provides a scarf pin safety clutch with a point guard or protector which entirely encases the pointed end of a scarf pin and causes the same to freely slide over a shirt or necktie without sticking into the same.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 1 is an elevation of a scarf pin having the safety clutch and point protector applied thereto; and Fig. 2 is a view corresponding to Fig. 1 with the exception that the upper portion of the scarf pin is broken away and the safety clutch and point protector sectioned.

The numeral 3 indicates a scarf pin to which the improved safety clutch is applied. This safety clutch includes a cylindrical casing 4 that is open at both ends and longitudinally contracted to form an internal cam-acting surface 5. Within the casing 4 is a cone 6 in which is mounted three circumferentially spaced radially movable clutch balls 7 that are subject to the cam-acting surface 5.

Integral with the cone 6 is a relatively long tubular stem 8 having a constant diameter, extends through the outer end of the casing 4 and materially outward thereof. Extending axially through the cone 6 and stem 8 is a pin passageway 9. A coiled spring 10 encircling the stem 8 is compressed between the cone 6 and internal flange on the outer end of the casing 4 and yieldingly holds the cone 6 with the balls 7 in contact with the cam surface 5 which projects the same into the pin passageway 9 and against the pin 3 to lock said clutch thereto. The outer end portion of the stem 8 is contracted to form a long blunt or rounded point 11 that closes the respective end of said stem and encases the sharp point of the scarf pin 3.

Encircling the stem 8 is an annular collar 12 which affords a finger-piece by which the cone 6 may be moved in the casing 4, against the tension of the spring 10, to release the clutch. The finger-piece 12 is closely associated with the adjacent end of the casing 4, is transversely curved so that there are no sharp edges, and is of a diameter less than that of the casing 4.

Obviously, the blunt point 11 of the safety clutch, which encases the sharp point of the pin 3, will freely slip over a shirt front and not catch therein so that the pin 3 will always remain in an upright position. In applying the clutch to a scarf pin the point of said pin is inserted into the passageway 9 from the inner end of the casing 4. The contact of the tapered point of the scarf pin 3 with the balls 7 will cam said balls out of the passageway 9 in advance of the movement of the scarf pin 3 therein and ride onto the body of said pin. The clutch balls 7 will securely hold the clutch on the pin 3 to prevent its removal therefrom. To release the clutch from the scarf pin 3 it is only necessary to draw outward on the finger-piece 12 in respect to the casing 4.

What I claim is:

1. A device of the class described comprising an open ended casing, a relatively movable clutch in the casing having a long stem that extends through the outer end of the casing and materially outward thereof, said clutch and stem having an axial pin passageway, the outer end of the stem being closed and contracted to a blunt point to encase the point of a pin therein and an external finger-piece on the stem closely associated with the respective end of the casing.

2. A device of the class described comprising an open ended casing, a relatively movable clutch in the casing having a long stem of a constant diameter that extends through the outer end of the casing and materially outward thereof, said clutch and stem having an axial pin passageway, the outer end portion of the stem being contracted to form a long blunt point that closes said passageway and encases the point of a pin therein, and a finger-piece on the stem in the form of an annular collar that is closely associated with the respective end of the casing.

In testimony whereof I affix my signature.

ERNST A. KIRCHNER.